United States Patent [19]

Foxworthy

[11] 4,068,163
[45] Jan. 10, 1978

[54] REED SWITCH OSCILLATOR ASSEMBLY FOR A POSITION INDICATING SYSTEM

[75] Inventor: Milton Kearney Foxworthy, Lancaster, Ohio

[73] Assignee: Diamond Power Specialty Corporation, Lancaster, Ohio

[21] Appl. No.: 701,772

[22] Filed: July 2, 1976

[51] Int. Cl.² ............................................. G01R 33/00
[52] U.S. Cl. ................................ 324/207; 340/188 R; 324/228
[58] Field of Search ............. 324/34 R, 34 D, 34 PS; 340/258 C, 188 R, 282; 200/84 C; 73/313, 314, DIG. 5; 335/153, 205–207, 151

[56] References Cited

U.S. PATENT DOCUMENTS

| | | | |
|---|---|---|---|
| 3,397,347 | 8/1968 | Hoeppel | 324/34 RS |
| 3,906,469 | 9/1975 | Kronk | 340/188 R |

*Primary Examiner*—M. Tokar
*Attorney, Agent, or Firm*—Vytas R. Matas; Joseph M. Maguire

[57] ABSTRACT

The position of a control rod located within a nuclear reactor is sensed by a position indicating system utilizing a series of self-exciting reed switch oscillator assemblies mounted along the path of control rod travel. Each reed switch oscillator assembly is preset to provide a constant level output signal when no external flux field is present and to provide an oscillating output signal whenever an external flux field is brought into the vicinity of the reed switch oscillator assembly. The control rod has a magnet mounted thereto which establishes an external flux field and causes the reed switch oscillator assembly proximate to the magnet to provide an oscillating output signal indicative of the position of the control rod.

4 Claims, 3 Drawing Figures

REED SWITCH OSCILLATOR ASSEMBLY FOR A POSITION INDICATING SYSTEM

BACKGROUND OF THE INVENTION

1. Field of the Invention

The present invention relates to position indicating systems generally and particularly to position indicating circuits for indicating the position of a nuclear reactor control rod.

2. Description of the Prior Art

Position indicating systems are generally known for indicating the position of a control rod in a nuclear reactor. Such known systems employ a permanent magnet mounted to the control rod to be movable internally of the reactor along with the control rod. A reed switch circuit is usually located externally of the control rod housing along the operating length of the control rod and hence along the operating length of the permanent magnet. As the control rod moves, different reed switches of the circuit are actuated by the magnetic flux of the permanent magnet and yield appropriate output signals whose magnitudes are indicative of the position of the control rod. These output signals are used to control the nuclear reactor.

The reed switches of such reed switch circuits have certain drawbacks such as an inherent hysteresis characteristic and the tendency to stick in the closed condition. The hysteresis problem results in an uncertainty as to the actual position of the control rod while a stuck reed switch provides an erroneous indication of the position of the control rod. To eliminate or minimize the hysteresis problem a higher density of reed switches is sometimes used with the outputs of at least two reed switches being energized per control rod position and these outputs then being averaged to provide a more accurate position indication. To eliminate the stuck reed switch problem, back-up reed switches are provided or the reed switch contacts are intermittently exercised by applying a strong alternating flux field to the reed switch to oscillate the contacts.

SUMMARY OF THE INVENTION

The present invention solves the forementioned problems of the prior art systems by providing a position indicating system for a control rod using reed switch assemblies which provide a more accurate and reliable output signal indicative of true control rod position.

To accomplish this the Applicant provides a series of reed switch assemblies spaced along the length of control rod travel and connected to provide output signals. As the control rod moves, a permanent magnet mounted to the control rod applies an external magnetic flux field to the individual reed switch assemblies. Each reed switch of the assembly has a coil wrapped around itself which conducts a direct current and establishes a magnetic flux field around the reed switch just below the flux level required to maintain the reed switch closed. The introduction of the external flux field from the permanent magnet in the vicinity of the reed switch combines with the magnetic flux field of the coil causing the total flux in the vicinity of the reed switch to exceed the reed switch close flux limit causing the reed switch contacts to close. The contacts of the reed switch are connected to a circuit which short-circuits the reed switch coil and drops the total flux level sufficiently to open the reed switch contacts. However, opening of the reed switch contacts disconnects the short circuit and again applies current to the coil and reestablishes the flux of the coil causing the contacts to again close. The closed contact again short circuit the coil and cause the contacts to open. Thus the contacts of the reed switch assembly will oscillate as long as the external flux of the permanent magnet remains in the vicinity of the contacts. Removal of the external flux field causes the total flux field to drop below the switch open limit causing the reed switch contacts to open. With the contacts open, the reed switch assembly can provide a constant output signal until it is again set into oscillation by the introduction of an external magnetic flux field at which time the reed switch assembly can provide an oscillating output signal.

In view of the foregoing it is seen tht one aspect of the present invention is to provide a position indicating circuit using reed switch assemblies which may establish an oscillating output signal indicative of control rod position.

Another aspect of the present invention is to provide a self-exciting reed switch oscillator assembly for use in a position indicating circuit.

These and other aspects of the present invention will be more fully understood from the following description of the preferred embodiment considered with the drawings.

DESCRIPTION OF THE PREFERRED EMBODIMENT

Figure 1:
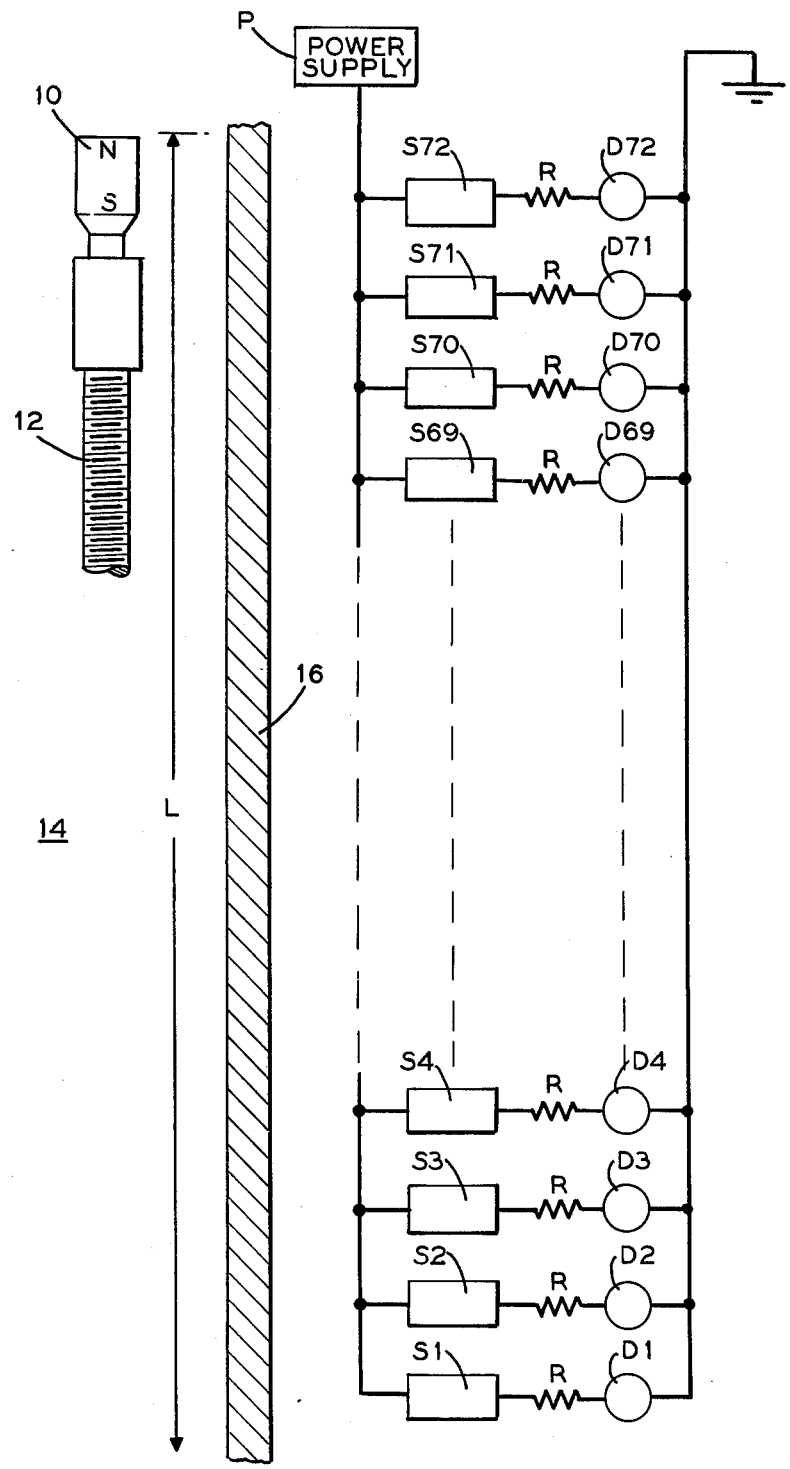
FIG. 1 is a schematic representation of the position indicating system of the present invention.

Referring now to the drawings, FIG. 1 depicts a permanent magnet 10 which is connected to a lead-screw extension 12 of a control rod (not shown) to be movable inside a sealed reactor housing 14 along with the control rod. The control rod is moved by any well-known drive means such as hydraulic jacks, roller nuts, pistons, etc. along a predetermined length L defining positions between full insertion of the control rod in the housing 14 and full withdrawal of the control rod from the housing 14.

The permanent magnet 10 sets up a field of localized magnetic flux which extends through a nonmagnetic wall 16 of the nuclear reactor housing 14 and establishes an external magnetic flux field $\phi_e$ in the area of any reed switch assembly proximate to the permanent magnet 10. The sealed integrity of the reactor housing 14 is thereby maintained. Mounted externally along the predetermined length L of the reactor housing 14 along a 2 inch spacing are a series of 72 magnetic reed switch assemblies $S_1$ through $S_{72}$. The reed switch assemblies $S_1$ through $S_{72}$ are in close proximity to the wall 16 and are spaced to allow individual actuation of the reed switch assemblies $S_1$ through $S_{72}$ as the permanent magnet moves along the length L.

The reed switch assemblies $S_1$ through $S_{72}$ are electrically parallel connected to a D.C. power supply P. Each reed switch assembly has a light emitting diode $D_1$–$D_{72}$ series connected thereto through a resistor R in each branch of the parallel connected reed switch assemblies $S_1$–$S_{72}$. The light emitting diodes $D_1$–$D_{72}$ will individually light up whenever its reed switch assembly $S_1$–$S_{72}$ is caused to oscillate as will be further explained later.

Figure 2:
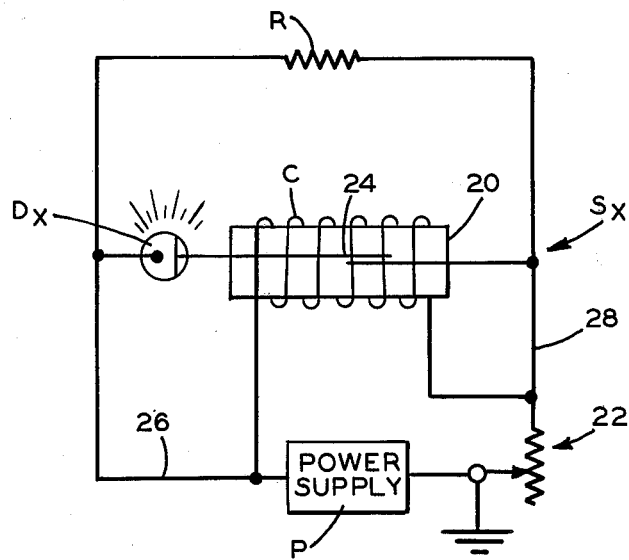
FIG. 2 is a blow up of one of the reed switch assemblies of the FIG. 1 system.
Figure 3:
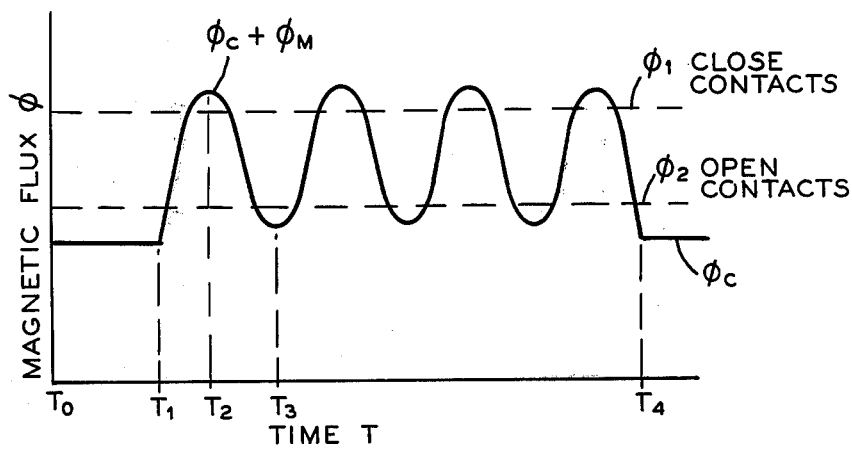
FIG. 3 is a graphic representation of the magnetic flux fields affecting the reed switch assembly of FIG. 2.

As may be best seen in FIGS. 2 and 3 each reed switch assembly $S_x$ has a coil C wrapped around a reed switch 20 with the coil C being powered by the direct current power source P. The current from the source P thus establishes a constant magnetic flux field $\phi_c$ around the reed switch 20 which is adjusted through an adjustable resistor 22 to be below the flux field level $\phi_2$ required to open contacts 24 of the reed switch 20. As is known, reed switches require a higher flux level $\phi_1$ to close the contacts 24 and a lower flux level $\phi_2$ to reopen the contacts 24. By maintaining the coil C flux level $\phi_c$ below the $\phi_2$ level, opening of the contacts 24 is insured.

Thus before the magnet 10 approaches the reed switch assembly $S_x$ prior to some time $T_1$, the reed switch contacts 24 are open and no current is provided to light the light emitting diode $D_x$. At time $T_1$ when the magnet 10 approaches the reed switch assembly $S_x$ the magnet 10 begins to establish a magnetic flux $\phi_m$ in the area of the reed switch assembly $S_x$. The total flux $\phi_c + \phi_m$ in the area of the reed switch $S_x$ builds up to a level exceeding the first magnetic flux level $\phi_1$ and causes the reed switch contacts 24 to close at a time $T_2$. Closing of the contacts 24 causes current flow through the diode $D_x$ causing it to light up. Closing the contacts 24 also short-circuits the coil C through electrical leads 26 and 28 connected to the power source P since the resistance of the diode $D_x$ is negligible in comparison to the resistance of the coil C. Hence the magnetic flux field $\phi_c$ of the coil C begins to decay. As the flux field $\phi_c$ decays, the total field $\phi_c + \phi_m$ decreases until the total field $\phi_c + \phi_m$ drops below the $\phi_2$ level at some time $T_3$ causing the contacts 24 to reopen. Opening of the contacts 24 again establishes current to the coil C and the total field $\phi_c + \phi_m$ again builds up until the $\phi_1$ level is exceeded and the contacts 24 are again closed. This oscillation of the total flux field $\phi_c + \phi_m$ continues until some time $T_4$ when the magnet 10 has moved away from the reed switch assembly $S_x$ a distance sufficient to prevent establishing the magnet flux $\phi_m$ in the area of the reed switch assembly $S_x$. The remaining flux $\phi_c$ being less than $\phi_2$ insures that the contacts 24 remain open until an external field $\phi_e$ is again introduced to induce oscillation. Since this oscillating is of a relatively high frequency the diode $D_x$ is seen to be continuously lit up during the oscillation.

From the foregoing it will be seen that by properly adjusting the flux $\phi_c$ to be less than the flux $\phi_2$ of the hysteresis envelope of the reed switch $S_x$ formed by $\phi_1$ and $\phi_2$ a reed switch assembly is provided which establishes self-exciting oscillation in response to an external flux field.

In the circuit described, a single faulty reed switch may substantially harm the performance of the circuit due to the single actuation of the reed switches. Other circuits are known which obviate this problem by using overlapping sequential actuation of reed switches and redundancy of reed switches. Thus it will be understood that the reed switch assembly of the present invention is applicable not only to the disclosed circuit but also to these other known circuits.

Certain modifications and improvements will occur to those skilled in the art upon reading this specification. As an example the diodes $D_x$ may be photocoupled to control circuitry to provide control over the reactor in response to certain indicated control rod position. It will be understood that all such modifications and improvements have been deleted herein for the sake of conciseness and readability but are properly within the scope of the following claims.

What I claim is:

1. A reed switch position indicating system for indicating the position of a movable member inside a sealed container by establishing an oscillating signal only when the movable member is proximate to the reed switch comprising:
    a magnetic flux producing member mounted to the movable member to be movable therewith;
    a reed switch having a pair of contacts that close in response to a first magnetic flux level and open in response to a second lower magnetic flux level mounted externally of the sealed container along the length of the sealed container to be actuated by the flux producing member as the movable member moves within the sealed container to indicate the position of the movable member thereby;
    a coil capable of conducting electric current therethrough wrapped around said reed switch;
    a source of electric current connected to said coil to establish a flux field in response to current passing through said coil lower than the second magnetic flux level;
    short circuit means connected to said reed switch for bypassing the current to said coil whenever said reed switch is actuated to close.

2. A position indicating system as set forth in claim 1 including a variable resistor connected between said coil and said source to adjust the flux field applied to said reed switch to a level below said second magnetic flux level to insure that the reed switch contacts will oscillate only when said flux producing member is proximate to the reed switch.

3. A self-exciting reed switch oscillator assembly comprising:
    a reed switch having contacts which are closed in response to a first magnetic flux level and opened in response to a second magnetic flux level lower than the first magnetic flux level;
    a coil wrapped around said reed switch for establishing a flux field around the contacts of said reed switch less than the second magnetic flux level;
    a source of external magnetic flux located in the area of the contacts, said external magnetic flux combining with the flux from said coil to raise the total flux level around the contacts of said reed switch above the first flux level;
    means connected to the contacts of said reed switch for alternately short circuiting the coil whenever the reed switch contacts are closed and energising the coil whenever the reed switch contacts are open; and
    a variable resistance element connected to said coil for adjusting the magnetic flux applied by said coil to said reed switch to a level below said second magnetic flux level to insure that the oscillator assembly will oscillate only in the presence of said source of external magnetic flux being located in the area of the contact.

4. A self-exciting reed switch oscillator assembly as set forth in claim 3 wherein said reed switch has a pair of contacts that close in response to a first magnetic flux level and open in response to a second lower magnetic flux level and wherein said short circuit means includes an electric circuit connected across said coil and to said contacts to bypass the current from said source to said coil through said contacts whenever said contacts are closed.

* * * * *